US005720372A

United States Patent [19]
Shino et al.

[11] Patent Number: 5,720,372
[45] Date of Patent: Feb. 24, 1998

[54] LUBRICATING STRUCTURE OF HYDRAULIC CLUTCH

[75] Inventors: Takeji Shino; Koji Kuroda; Takayuki Yakou, all of Wako, Japan

[73] Assignee: Honda Giken Kogyo Kabushiki Kaisha, Tokyo, Japan

[21] Appl. No.: 677,927

[22] Filed: Jul. 10, 1996

[30] Foreign Application Priority Data

Jul. 25, 1995 [JP] Japan .................... 7-189021

[51] Int. Cl.$^6$ .................... F16D 25/06; B60K 17/34
[52] U.S. Cl. .................... 192/70.12; 192/85 CA; 192/113.34
[58] Field of Search .................... 192/70.12, 85 CA, 192/113.3, 113.34, 91 A

[56] References Cited

U.S. PATENT DOCUMENTS

| | | | |
|---|---|---|---|
| 4,074,663 | 2/1978 | Cory | 192/70.12 X |
| 4,077,500 | 3/1978 | Hickman, Sr. et al. | 192/70.12 X |
| 4,646,889 | 3/1987 | Hoffman et al. | 192/70.12 |
| 4,776,444 | 10/1988 | Worner et al. | 192/85 CA |
| 5,094,328 | 3/1992 | Palmer | 192/70.12 X |

FOREIGN PATENT DOCUMENTS

| | | |
|---|---|---|
| 4-41126 | 4/1992 | Japan . |
| 4-54866 | 2/1995 | Japan . |

*Primary Examiner*—Charles A. Marmor
*Assistant Examiner*—Saul J. Rodriguez
*Attorney, Agent, or Firm*—Armstrong, Westerman, Hattori, McLeland & Naughton

[57] ABSTRACT

A clutch plate is supported by a clutch housing which rotates in unison with an input shaft. Another clutch plate is supported by a clutch hub which rotates in unison with an output shaft. These clutch plates are disposed adjacent each other and are pressed and engaged with each other by a clutch piston through a pressure plate. A hydraulic pump is driven by the pressure plate through a pump driving member fitted to an outer periphery of the output shaft. Lubricating oil supplied from a lubricating oil port is conducted to the clutch plates through a lubricating oil passage formed between an outer periphery of the output shaft and an inner periphery of the pump driving member. The lubricating oil passage for conducting the lubricating oil to frictional engagement elements of the hydraulic clutch is formed outside the rotatable shaft, thereby reducing the fabricating cost of the apparatus.

4 Claims, 3 Drawing Sheets

LUBRICATING STRUCTURE OF HYDRAULIC CLUTCH

BACKGROUND OF THE INVENTION

1. Field of the Invention

The present invention relates to a lubricating structure of a hydraulic clutch for supplying a lubricating oil from a hydraulic pump driven by a first rotatable shaft to a frictional engagement element of the hydraulic clutch which transmits power between the first rotatable shaft and a second rotatable shaft.

2. Description of the Related Art

Such a lubricating structure of a hydraulic clutch is already known from Japanese Utility Model Application Laid-open No. 4-41126 and Japanese Patent Application Laid-open No. 7-54866.

In the above known lubricating structure of a hydraulic clutch, a lubricating oil passage for leading the lubricating oil from a hydraulic pump to the frictional engagement element of the hydraulic clutch is formed inside a rotatable shaft connected to an inner member of the hydraulic clutch. Therefore, it is laborious to fabricate the lubricating structure and the fabricating cost becomes expensive.

SUMMARY OF THE INVENTION

The present invention has been accomplished in view of the above circumstances, and it is an object of the invention to make it possible to form the lubricating oil passage outside the rotatable shaft, so as to reduce fabricating costs.

According to the present invention, there is provided a lubricating structure of a hydraulic clutch, comprising: an outer member coupled to a first rotatable shaft; an inner member coupled to a second rotatable shaft coaxially disposed with respect to the first rotatable shaft; a first frictional engagement element supported by the outer member; a second frictional engagement element supported by the inner member; a clutch piston for placing the first and second frictional engagement elements in pressurized contact with each other; a hydraulic pump disposed on the opposite side of the first and second frictional engagement elements with respect to the clutch piston; a pump driving member fitted for rotation relative to an outer periphery of the second rotatable shaft, and having one end connected to the outer member and the other end connected to hydraulic pump; and a lubricating oil passage for conducting a lubricating oil from the hydraulic pump to the first and second frictional engagement elements, wherein the lubricating oil passage is formed between an inner periphery of the pump driving member and an outer periphery of the second rotatable shaft.

With the above arrangement, the lubricating oil passage which conducts lubricating oil from the hydraulic pump to the hydraulic clutch is formed between the inner periphery of the pump driving member which drives the hydraulic pump and the outer periphery of the second rotatable shaft. Therefore, it is unnecessary to form the lubricating oil passage inside the second rotatable shaft, which makes it possible to reduce the fabricating cost, and to provide a wide flow passage area in the lubricating oil passage to enhance the lubricating efficiency of the hydraulic clutch.

The above and other objects, features and advantages of the invention will become apparent from the following description of a preferred embodiment taken in conjunction with the accompanying drawings.

DETAILED DESCRIPTION OF THE PREFERRED EMBODIMENT

The present invention will now be described by way of an embodiment with reference to the accompanying drawings.

Figure 1:
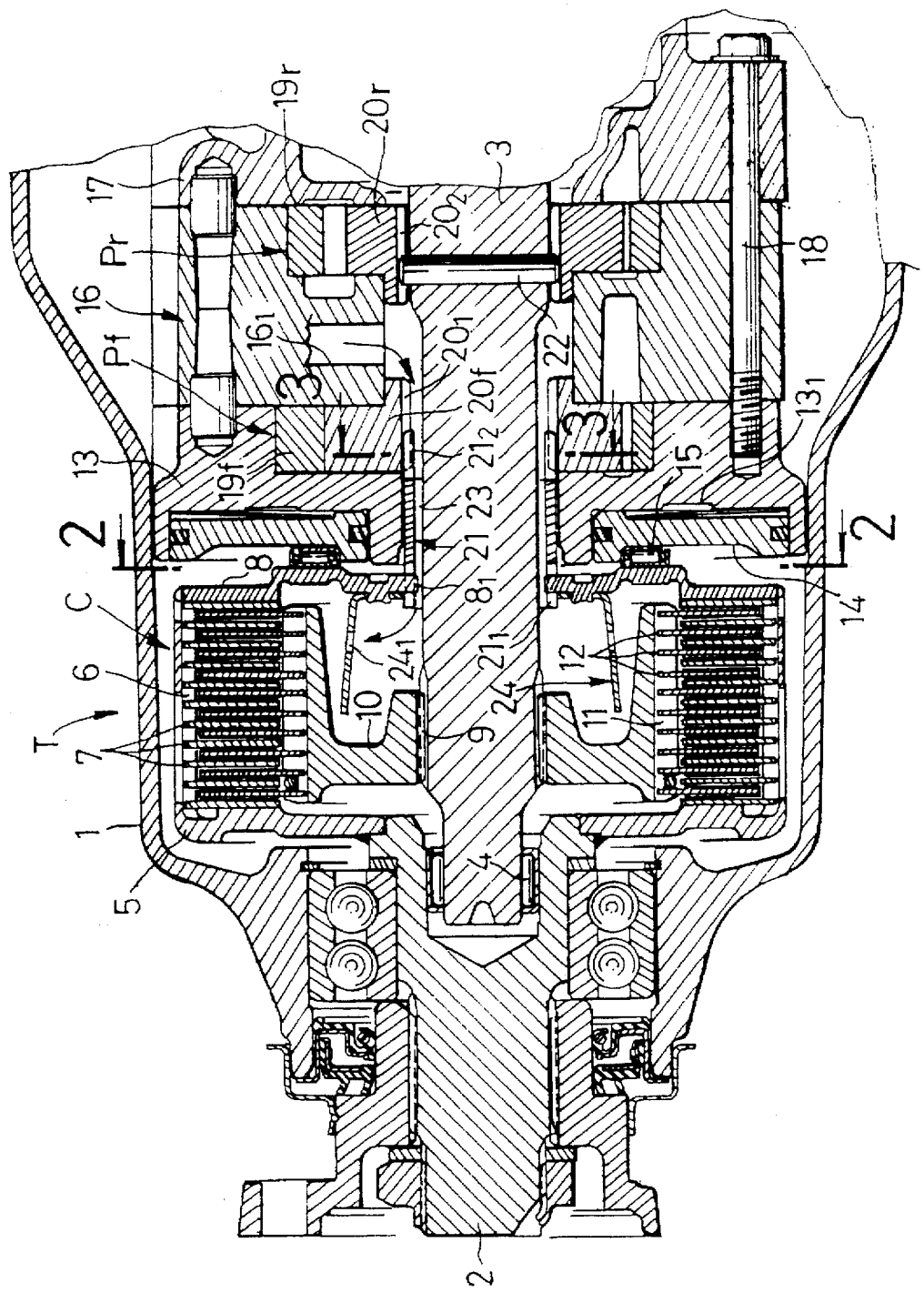
FIG. 1 is a vertical sectional view of a power transmission system.

FIG. 1 shows a power transmission system T mounted in a four-wheel drive vehicle. The power transmission system T is disposed between front wheels, which are driven by an engine in full-time, and rear wheels to which a portion of driving power from the front wheels is selectively transmitted in part-time. The power transmission system T controls the power transmission from the front wheels to the rear wheels so as to switch between a four wheel driving state and front wheel driving state. In a casing 1 of the power transmission system T, an input shaft 2 (first rotatable shaft) connected to the front wheels and an output shaft 3 (second rotatable shaft) connected to the rear wheels are coaxially supported. A front end of the output shaft 3 is journaled for relative rotation within a rear end of the input shaft 2 by means of needle bearings 4.

A hydraulic clutch C is disposed within the casing 1, and is provided with a drum-like clutch housing 5 (outer member) which is welded to a rear end of the input shaft 2. A spline 6 is formed on an inner periphery of the clutch housing 5. A plurality of clutch plates 7 . . . (the first frictional engagement element) are axially slidably engaged with the spline 6. A pressure plate 8 is axially slidably engaged with a rear end of the spline 6.

A clutch hub 10 (the inner member) is secured to the front end of the output shaft 3 through a spline 9. A spline 11 is formed on an outer periphery of the clutch hub 10, and is axially slidably engaged with a plurality of clutch pages 12 . . . (the second frictional engagement element). And, the clutch plates 7 . . . supported on the side of the clutch housing 5 and the clutch plates 12 . . . supported on the side of the clutch hub 10 are alternatively adjacently disposed such that they can abut against one another.

A front side plate 13 is positioned at a rear portion of the hydraulic clutch C. A front surface of a clutch piston 14, which is axially slidably fitted into the front side plate 13, is abutted against the pressure plate 8 through a thrust bearing 15. Therefore, when hydraulic pressure is applied to a hydraulic pressure chamber $13_1$ defined between the front side plate 13 and the clutch piston 14, the pressure plate 8 is urged forwardly by the clutch piston 14 and thrust bearing 15, and the pressure plate 8 causes the clutch plates 7 . . . and 12 . . . to engage each other. As a result, rotation of the input shaft 2 is transmitted to the output shaft 3 through the clutch housing 5, the spline 6, the clutch plates 7 . . . , the clutch plates 12 . . . , the spline 11, the clutch hub 10 and the spline 9, and the driving force of the front wheels is distributed to the rear wheels.

A central side plate 16 and a rear side plate 17 are adjacently disposed on a rear surface of the front side plate 13 and integrally coupled to each other by bolts 18 . . . A first hydraulic pump Pf is disposed between the rear surface of the front side plate 13 and a front surface of the central side plate 16. The first hydraulic pump Pf is composed of a trochoid pump which includes an outer rotor $19f$ having internal teeth and an inner rotor $20f$ having external teeth which are mutually meshed. A second hydraulic pump Pr is disposed between a rear surface of the central side plate 16 and a front surface of the rear side plate 17. The second hydraulic pump Pr is also composed of a trochoid pump which includes an outer rotor 19r having internal teeth and an inner rotor 20r having external teeth which are mutually meshed.

Figure 2:
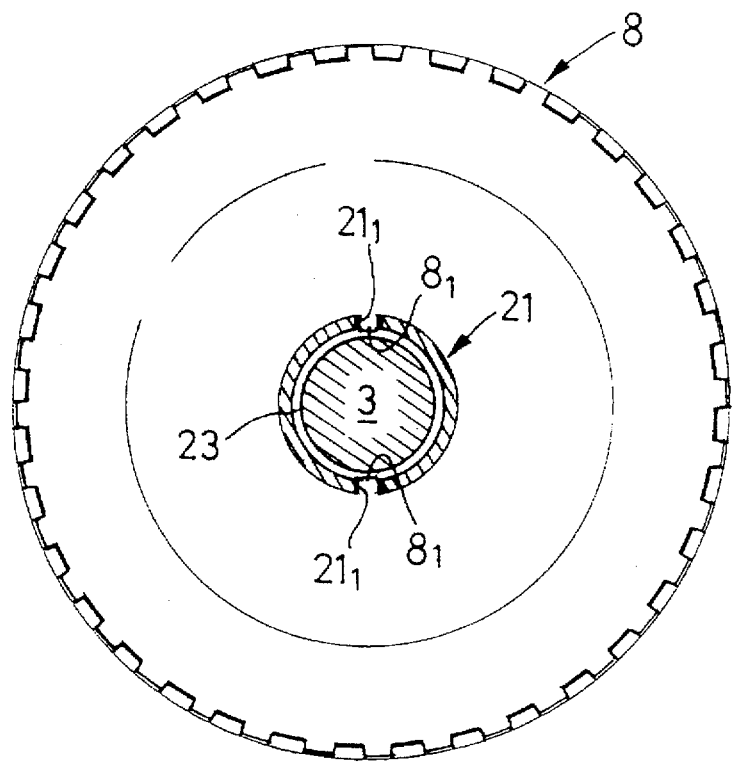
FIG. 2 is an enlarged sectional view taken along the line 2—2 in FIG. 1.
Figure 3:
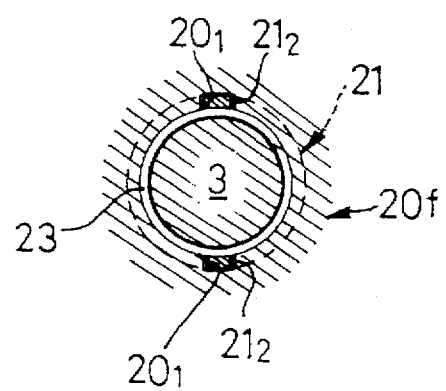
FIG. 3 is an enlarged sectional view taken along the line 3—3 in FIG. 1.
Figure 4:
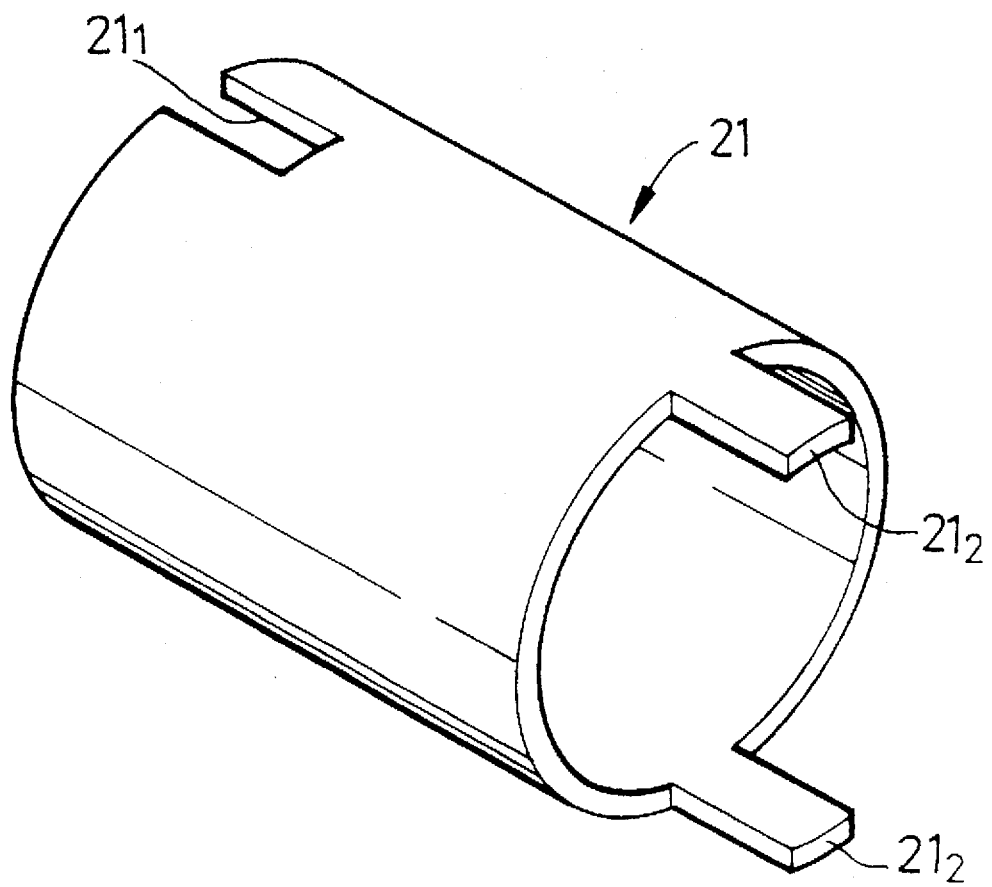
FIG. 4 is a perspective view of a pump driving member.

Referring also to FIGS. 2 to 4, a substantially cylindrical pump driving member 21 is rotatably disposed between an outer periphery of the output shaft 3 and an inner periphery of the front side plate 13. Two notches $21_1$, $21_1$ are formed in a front end of the pump driving member 21. These two notches $21_1$, $21_1$ interlock with two projections $8_1$, $8_1$ which extend from an inner periphery of the pressure plate 8. Two projections $21_2$, $21_2$ are formed on a rear end of the pump driving member 21. These two projections are engaged with two notches $20_1$, $20_1$ formed in an inner periphery of the inner rotor 20f of the first hydraulic pump Pf. Therefore, rotation of the input shaft 2 is transmitted to the inner rotor 20f of the first hydraulic pump Pf through the clutch housing 5, the spline 6, the pressure plate 8 and the pump driving member 21, and the first hydraulic pump Pf is driven for rotation at the same rotational velocity as that of the input shaft 2.

Returning to FIG. 1, opposite ends of a pin 22 passing through the output shaft 3 in a diametral direction thereof are engaged with two notches $20_2$, $20_2$ formed in an inner periphery of the inner rotor 20r of the second hydraulic pump Pr. Therefore, rotation of the output shaft 3 is transmitted to the inner rotor 20r of the second hydraulic pump Pr through the pin 22, and the second hydraulic pump Pr is driven for rotation at the same rotational velocity as that of the output shaft 3.

A control valve for switching between oil passages connected to the first and second hydraulic pumps Pf and Pr, and a relief valve (not shown) for discharging surplus oil, and the like, are accommodated in an interior of the central side plate 16. A lubricating oil port $16_1$ is formed such as to face the outer periphery of the output shaft 3. A portion of oil discharged from the relief valve is supplied, as lubricating oil, to the lubricating oil port $16_1$. A lubricating oil passage 23 is formed between the outer periphery of the output shaft 3 and the inner periphery of the pump driving member 21. A rear end of the lubricating oil passage 23 is communicated with the lubricating oil port $16_1$, and a front end of the lubricating oil passage 23 is communicated with an inner space of the clutch housing 5.

An annular lubricating oil distribution member 24 is secured to a front surface of the pressure plate 8. A plurality of penetration holes $24_1$ ... are formed in the lubricating oil distribution member 24.

Next, operation of the present embodiment having the above structure will be described.

When the vehicle starts forwardly, the driving force of the engine is transmitted to the front wheels, and the first hydraulic pump Pf is driven by the driving force through the input shaft 2. At that time, the hydraulic clutch C is in a non-engaged state, and the second hydraulic pump Pr connected to the output shaft 3 is stopped. Therefore, a difference exists between the discharge mounts produced by the first and second hydraulic pumps Pf and Pr, and the hydraulic clutch C is engaged by hydraulic pressure generated based on such difference. As a result, a portion of the driving force of the front wheels is transmitted to the rear wheels, thereby bringing the vehicle into a four-wheel drive state.

When the hydraulic clutch C is engaged and the driving force is distributed to the rear wheels, the discharge amount of the second hydraulic pump Pr connected to the output shaft 3 is increased as the rotational speed of the rear wheels is increased. And when the vehicle reaches, for example, a constant speed traveling state, in which the difference between the rotational speeds of the front and rear wheels become substantially 0, the discharge amounts of the first and second hydraulic clutch Pf and Pr also becomes 0. Therefore, oil pressure is not applied to the hydraulic oil pressure chamber $13_1$ of the hydraulic clutch C, and distribution of the driving force to the rear wheels is cut, thereby bringing the vehicle into a front-wheel drive state.

During the constant speed traveling of the vehicle, when only the front wheels tread a road of low coefficient of friction, or when the vehicle tries to accelerate rapidly, the front wheels may be brought, in some cases, into a slipping state transitively. In such a state, the discharge amount of the first hydraulic pump Pf connected to the input shaft 2 exceeds that of the second hydraulic pump Pr connected to the output shaft 3, and the hydraulic clutch C is engaged to distribute the driving force to the rear wheels.

A portion of the discharged oil from the first and second hydraulic pumps Pf and Pr is supplied to the outer periphery of the output shaft 3 from the lubricating oil port $16_1$, and flows forwardly in the lubricating oil passage 23 formed between the outer periphery of the output shaft 3 and the inner periphery of the pump driving member 21, and is supplied to the inner space of the clutch housing 5 of the hydraulic clutch C. The lubricating oil supplied to the inner space of clutch housing 5 is caught by an inner peripheral surface of the lubricating oil distribution member 24, which rotates together with the pressure plate 8, and is scattered radially outwardly by centrifugal force from the plurality of penetration holes $24_1$ ... formed in the lubricating oil distribution member 24. As a result, it is possible to uniformly lubricate slide surfaces of the clutch plates 7 ... and 12 ....

As described above, the lubricating oil passage 23 which conducts lubricating oil from the lubricating oil port $16_1$ of the central side plate 16 to the hydraulic clutch C is formed between the outer periphery of the output shaft 3 and the inner periphery of the pump driving member 21. Therefore, it is unnecessary to form the lubricating oil passage 23 inside the output shaft 3 and thus, the fabricating cost is greatly reduced. Moreover, since a larger flow area of the lubricating oil passage 23 can be secured, as compared with a case where the lubricating oil passage 23 is formed inside the output shaft 3, it is possible to enhance the lubricating efficiency of the hydraulic clutch C.

Although the embodiment of the present invention has been described in detail, it will be understood that the present invention is not limited to the above-described embodiment, and various modifications in design may be made without departing from the spirit and scope of the invention defined in claims.

What is claimed:

1. A lubricating structure for a hydraulic clutch apparatus including an outer member coupled to a first rotatable shaft, an inner member coupled to a second rotatable shaft coaxially disposed with said first rotatable shaft, a first frictional engagement element supported by said outer member, a second frictional engagement element supported by said inner member, and a clutch piston for selectively placing said first and second frictional engagement elements in pressurized contact with respect to each other, said lubricating structure comprising:

a hydraulic pump disposed within said clutch on the side of said clutch piston opposite said first and second frictional engagement elements;

a pump driving member disposed about an outer periphery of said second rotatable shaft and being rotatable relative thereto, said pump driving member having one end connected to said outer member of said clutch apparatus and the other end connected to said hydraulic pump for drivingly connecting said hydraulic pump to said clutch apparatus outer member, and said pump driving member being concentrically spaced with respect to said second rotatable shaft to define a lubricating oil passage between said hydraulic pump and said clutch apparatus.

2. A lubricating structure for a hydraulic clutch according to claim 1 in which said pump driving member comprises a cylindrically formed body containing means at one axial end for connection with said outer member and means at the other axial end for connection with said hydraulic pump.

3. A lubricating structure for a hydraulic device according to claim 2 in which said outer member is a pressure plate cooperable with said clutch piston for selectively placing said first and second friction engagement elements in pressurized contact with each other, said pressure plate and said hydraulic pump each containing projections extending from their inner peripheries for interlocking engagement with said ends of pump driving member.

4. A lubricating structure for a hydraulic clutch according to claim 3 including a lubricating oil distribution member attached to said pressure plate and operable to receive lubricating oil from said passage and for centrifugally distributing it to said first and second engagement members.

* * * * *